United States Patent
Sherry et al.

(10) Patent No.: US 10,472,531 B2
(45) Date of Patent: Nov. 12, 2019

(54) INK COMPOSITION

(71) Applicant: Hewlett-Packard Development Company, L.P., Fort Collins, CO (US)

(72) Inventors: Linda Sherry, Leixlip (IE); Niamh Kelly, Leixlip (IE); Richard J. McManus, Corvallis, OR (US); Kevin Rattigan, Leixlip (IE); John Breen, Belfast (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 126 days.

(21) Appl. No.: 15/563,098

(22) PCT Filed: Jul. 20, 2015

(86) PCT No.: PCT/US2015/041135
§ 371 (c)(1),
(2) Date: Sep. 29, 2017

(87) PCT Pub. No.: WO2017/014742
PCT Pub. Date: Jan. 26, 2017

(65) Prior Publication Data
US 2018/0094151 A1     Apr. 5, 2018

(51) Int. Cl.
| | | |
|---|---|---|
| C09D 11/322 | (2014.01) |
| C09D 11/102 | (2014.01) |
| C09D 11/324 | (2014.01) |
| C09D 11/38 | (2014.01) |

(52) U.S. Cl.
CPC .......... *C09D 11/322* (2013.01); *C09D 11/102* (2013.01); *C09D 11/324* (2013.01); *C09D 11/38* (2013.01)

(58) Field of Classification Search
None
See application file for complete search history.

(56) References Cited

U.S. PATENT DOCUMENTS

| | | | |
|---|---|---|---|
| H002113 H * | 1/2005 | Nichols | 523/160 |
| 6,852,156 B2 | 2/2005 | Yeh et al. | |
| 9,187,665 B2 * | 11/2015 | Vasudevan | C09D 11/324 |
| 9,193,884 B2 * | 11/2015 | Vasudevan | B41J 2/165 |
| 9,410,010 B2 * | 8/2016 | Roberts | C08G 18/0823 |
| 9,738,804 B2 * | 8/2017 | McManus | C09D 11/102 |
| 2007/0040880 A1 * | 2/2007 | Jackson | C09D 11/322 347/100 |
| 2007/0091156 A1 | 4/2007 | Jackson | |
| 2008/0178766 A1 | 7/2008 | McGorrin | |
| 2011/0039028 A1 | 2/2011 | Spinelli et al. | |
| 2012/0329921 A1 | 12/2012 | Vasudevan et al. | |
| 2013/0050363 A1 * | 2/2013 | Usui | B41J 2/175 347/93 |
| 2013/0079447 A1 * | 3/2013 | Koike | C09D 11/322 524/377 |
| 2014/0285593 A1 | 9/2014 | Vasudevan et al. | |
| 2017/0088735 A1 * | 3/2017 | Jakubek | C09D 11/102 |
| 2017/0152390 A1 * | 6/2017 | Vasudevan | C09D 11/38 |

FOREIGN PATENT DOCUMENTS

| | | |
|---|---|---|
| WO | 0194476 | 12/2001 |
| WO | 2009034394 | 3/2009 |
| WO | WO 2015/187179 A1 * | 12/2015 |
| WO | WO 2015/187180 A1 * | 12/2015 |
| WO | WO 2015/187181 A1 * | 12/2015 |

OTHER PUBLICATIONS

International Search Report and Written Opinion dated Nov. 17, 2015 for PCT/US2015/041135; Applicant Hewlett-Packard Development Company L.P.

* cited by examiner

*Primary Examiner* — Helene Klemanski
(74) *Attorney, Agent, or Firm* — Thorpe North & Western LLP

(57) ABSTRACT

The present disclosure relates to an ink composition containing a colorant; a hydroxylated co-solvent; a non-hydroxylated co-solvent, a polyurethane binder and water. The weight percent ratio of the hydroxylated co-solvent to the non-hydroxylated co-solvent in the ink composition ranges from 55:45 to 65:35; and the total amount of hydroxylated co-solvent and non-hydroxylated co-solvent in the ink composition is at least 18 wt %. The amount of polyurethane binder in the ink composition is 0.1 to less than 1 wt %.

17 Claims, 2 Drawing Sheets

INK COMPOSITION

BACKGROUND

Inkjet printing or recording systems are commonly used as an effective way to produce images on a print medium, such as paper. Ink droplets are ejected from a nozzle by the inkjet printing system and onto the print medium to produce an image thereon. Examples of inkjet printing systems include thermal inkjet printers and piezoelectric inkjet printers.

BRIEF DESCRIPTION OF FIGURES

Various examples will be described below, by way of example, with reference to the following figures.

DETAILED DESCRIPTION

Figure 1:
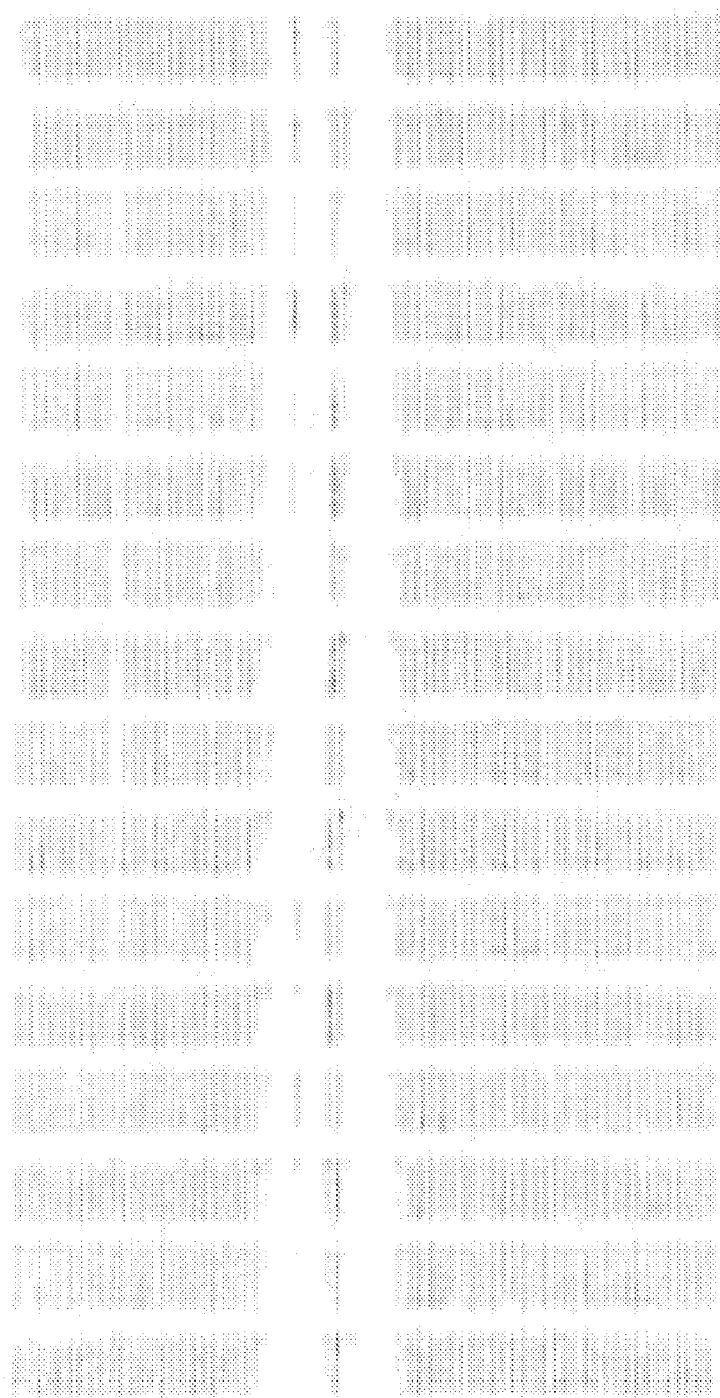
FIGS. 1 and 2 show patterns printed using the stored inks of Comparative Example 1 and Example 2, respectively.

Examples of the ink composition disclosed in the present disclosure exhibit desirable print quality (e.g. optical density), print reliability, and decap performance (thereby maintaining good nozzle health). With many inkjet inks, it is difficult to simultaneously achieve all of these attributes. For example, inks having a relatively high solids content (e.g. pigment and/or polymer/binder loading) for improved image optical density and durability may exhibit poor print reliability. As another example, inks having a lower solids content for improved print reliability and decap performance may result in images with poor optical density and/or durability.

The term "print reliability," as used in the present disclosure refers to the ability of a print cartridge or pen to recover and successfully print after being stored capped for some extended period of time. During capped storage, the colorant in the ink may settle out of the dispersed state and plug the nozzle(s) of the print cartridge. Also during capped storage, the polymer/binder, alone or in combination with the colorant, may form a plug locally within the nozzle. If nozzles are completely plugged, the print cartridge may be rendered useless. It has been found that blocked nozzles may be skewed towards one end of the print cartridge (e.g. the lower end if the cartridge is stored on an angle/tilt, e.g. 5°). The skewed failure may be due to settling colorant. Capped storage has also been found to lead to random nozzle failure throughout the print cartridge (i.e. nozzle failure is not concentrated to one particular area of the cartridge). Random nozzle failure may be due to locally formed binder or binder and colorant plugs.

The term "decap performance," as referred to in the present disclosure, means the ability of the inkjet ink to readily eject from the printhead, upon prolonged exposure to air. The decap time may be measured as the amount of time that a printhead may be left uncapped before the printer nozzles no longer fire properly, for example because of clogging, plugging, or retraction of the colorant from the drop forming region of the nozzle/firing chamber. The length of time a thermal inkjet pen can remain unused and uncapped before spitting would be required to form an acceptable quality ink drop is called decap time, or first drop decap time. Another decap metric is the number of spits required to get the pen healthy at a specific time interval. The longest decap time that would give acceptable first drop quality or the fewest number of spits required at any given decap time would be desirable for any given ink.

As water evaporates from an ink formulation, the percentage of organic components in the ink may increase. As the ink becomes more enriched in the organic co-solvents and other nonvolatile components, a colorant (e.g. a dispersed pigment) which is strongly hydrophilic may be pulled back/retracted into the bulk of the aqueous phase.

Examples of the present disclosure may control the degree/rate of pigment retraction in an efficient and cost-effective manner. Pigment retraction is referred to in the present disclosure as "pigment ink vehicle separation" (PIVS).

As pigmented ink dries in an inkjet printhead, a rapid PIVS may take place (e.g. within about 1-4 seconds), which may result in the nozzles and/or the ink channel being substantially devoid of the colorant. As such, a rapid rate of PIVS may be undesirable because of the idle (or decap) time being too short. To address PIVS, inkjet printers may force the printhead to spit onto a special absorbing pad/spittoon on a regular basis after a period of idle time (e.g. a predetermined number of spits per nozzle at a given frequency may maintain nozzle health of idle nozzles during printing). The rate of spitting is substantially controlled by the rate of PIVS. Very frequent spits may be undesirable, because ink is consumed during spitting, and printing is slowed down.

In contrast, a slow rate of PIVS (e.g., from about greater than 4 seconds to about 60 seconds) may be beneficial for the printhead functioning, for example, when the printhead is stored in an uncapped position, because it prevents the undesirable clogging of the nozzles or retraction of the colorant from the nozzle. Further, in some instances, it may be desirable for a print system to exhibit very slow PIVS (e.g., from greater than a minute to several hours).

Examples of the ink composition disclosed in the present disclosure include components that provide excellent print reliability (e.g. optical density) and decap performance (and hence nozzle health).

The present disclosure relates to an ink composition comprising
  a colorant;
  a hydroxylated co-solvent;
  a non-hydroxylated co-solvent, wherein the weight percent ratio of the hydroxylated co-solvent to the non-hydroxylated co-solvent in the ink composition ranges from 55:45 to 65:35; and wherein the total amount of hydroxylated co-solvent and non-hydroxylated co-solvent in the ink composition is at least 18 wt %;
  a polyurethane binder; wherein the amount of polyurethane binder in the ink composition is 0.1 to less than 1 wt %; and
  water.

The present disclosure also relates to an ink composition comprising
  a colorant;
  a hydroxylated co-solvent;
  a non-hydroxylated co-solvent, wherein the weight percent ratio of the hydroxylated co-solvent to the non-hydroxylated co-solvent in the ink composition ranges from 55:45 to 65:35;
  a urea-capped polyurethane binder; and
  water.

There is also provided a print cartridge comprising a) a fluid reservoir containing an ink composition as described in the present disclosure; b) a fluid ejector in fluid communication with the fluid reservoir; and a nozzle in fluid communication with the fluid ejector.

The total amount of hydroxylated co-solvent and non-hydroxylated co-solvent in the ink composition may be at least 18 wt %. The polyurethane binder may be present in an amount of 0.1 to less than 1 weight %.

The ink composition disclosed in the present disclosure includes a combination of a polyurethane binder and a particular co-solvent system. It is believed that the polyurethane binder and the co-solvent system may interact with each other to enable the polyurethane binder to be included in sufficient amounts to provide adequate or desirable print durability without deleteriously affecting the print reliability in terms, for example, of nozzle health (e.g. decap performance). In the examples disclosed in the present disclosure, the combination of these two solvents unexpectedly results in an ink composition that does not or is less likely to exhibit either blocked nozzles skewed towards one end of the print cartridge or random nozzle failure. At the same time, polyurethane binder may be employed in sufficient amounts to obtain adequate or desirable durability of the image, while achieving desirable print characteristics in terms of, for example, optical density.

In addition, the ink composition disclosed in the present disclosure may be suitable for use with any inkjet printing system (e.g. thermal, piezoelectric). For example, the ink composition may be printed with an inkjet printer having a drop frequency ranging from about 2 kHz to about 36 kHz.

In some examples, the ink composition includes the colorant, the co-solvent system, an acid, the polyurethane copolymer binder, lithium, and a balance of water. Other additives, such as a biocide or a non-ionic surfactant may also be added to the ink composition.

The colorant may be any of self-dispersed pigments, polymer dispersed pigments, dyes, and combinations thereof. In one example, an oxidized self-dispersible pigment dispersion is used as the colorant. The pigment may be a colorant particle that is substantially insoluble in the liquid vehicle in which it is used. Self-dispersed pigments include those that which have been chemically modified at the surface, for example, with a charge or a polymeric grouping. This chemical modification aids the pigment in becoming and/or substantially remaining dispersed in a liquid. Self-dispersed pigments tend to have greater stability and lower viscosity when compared to traditional pigments and dyes; and thus provide substantially greater flexibility in formulating the ink composition(s) disclosed in the present disclosure. A non-self-dispersed pigment utilizes a separate and unattached dispersing agent in the liquid vehicle or physically coated on the surface of the pigment.

Carbon black dispersions may be used as the colorant in examples of the present ink composition. For example, carbon blacks may be used that are of the lamp black, furnace black or gas black type. These carbon blacks may be made water-dispersive through oxidation, either through the carbon black process or through post carbon black manufacturing treatment (e.g. by ozonation); by reaction of the carbon black surface with either small molecule, oligomeric or polymeric materials that are water soluble or dispersive in nature (e.g. p-aminobenzoic acid, acrylic based oligomers or polymers made of monomers such as acrylic or methacrylic acid and esters thereof, and/or polyurethane oligomers or polymers). These carbon blacks may also be made dispersive in water through adsorption of oligomers or polymers of the previously described acrylic, methacrylic, or polyurethane compositions. Carbon blacks can be further made dispersive through encapsulation of the pigment with a latex polymer composed of, e.g., acrylic acid, acrylic esters, methacrylic acid, methacrylic esters, styrene or vinyl acetate. These materials can be made dispersive through the inclusion of various functional groups (such as carboxylates, sulfonates, phosphates or ethylene oxide derivatives) within the polymer.

In some examples, the colorant comprises a self-dispersed black (e.g. carbon black) pigment dispersion or a combination of a self-dispersed black (e.g. carbon black) pigment and a non-dispersed black (e.g. carbon black) pigment dispersion. The self-dispersed carbon black may be oxidized, for example, via ozonation or other oxidation method.

Some suitable self-dispersed carbon blacks, as well as polymer dispersed pigments are commercially available from E.I. du Pont de Nemours and Co. (Wilmington, Del.), Sensient Technologies Corporation (Milwaukee, Wis.), and Cabot Corporation (Boston, Mass.).

Other pigments with no limitation on color or chemical composition can be used, some examples of which include PY74, PY155, PY128, PY185, PR122, PR254, PR178, PV19, PB15:2, PB15:3, and PB15:4. These colorants can also be made dispersive in water by various means such as small molecule, oligomeric or polymeric attachment, through adsorption of oligomeric or polymeric materials, or through encapsulation (e.g., as described for carbon black).

Any suitable dyes may be used in examples of the present ink composition.

In the examples disclosed in the present disclosure, the colorant (e.g. self-dispersed carbon black dispersion) is present in an amount ranging from about 1 wt % to about 6.5 wt % of the total weight of the ink composition. In another example, the colorant (e.g. self-dispersed carbon black dispersion) is present in an amount ranging from about 1.5 wt % to about 4.5 wt %, for instance, about 2 to 4 wt % of the total weight of the ink composition. It is to be understood that the colorant, along with the polyurethane copolymer binder, makes up the high solids content of the ink composition. In an example, the colorant loading and the polyurethane copolymer binder loading are selected so that the total solids content of the ink composition ranges from about 3 wt % to about 7 wt % of the total weight percent of the ink composition. Any suitable amount of the colorant and/or binder within the given ranges may be selected as long as the total (high) solids content of the ink composition ranges from about 3.5 wt % to about 5 wt %. Examples of the polyurethane copolymer binder amount are described below.

The co-solvent system disclosed in the present disclosure includes a hydroxylated co-solvent and a non-hydroxylated co-solvent. The weight percent ratio of the hydroxylated co-solvent to the non-hydroxylated co-solvent ranges from 55:45 to 65:35. In an example, the ink composition comprises the hydroxylated solvent in an amount of about 11 to 14.5 wt % of the ink composition; and the non-hydroxylated co-solvent is present in an amount ranging from 7 to 10.5 wt % of the ink composition. The respective weight percent is selected so that the weight percent ratio of hydroxylated to non-hydroxylated co-solvents is in accordance with the range provided in the present disclosure. The hydroxylated solvent is present in an amount that is greater than the non-hydroxylated solvent. In some examples, sulfolane is absent from the composition. In some example, the solvents in the composition consist essentially of the hydroxylated co-solvent and non-hyrdoxylated solvent. In some examples, no other solvents are included in the ink composition. In some examples, a single non-hydroxylated solvent (e.g. a pyrrolidinone solvent, such as 2-pyrrolidinone) is employed. In some examples, a single hydroxylated solvent (e.g. a hydroxylated pyrrolidine solvent such as 1-(2-hydroxyethyl)-2-pyrrolidinone) is employed. In other examples, a combination of two or more hydroxylated solvents is employed.

Examples of the hydroxylated co-solvent include 2-methyl-1,3-propanediol, 1-(2-hydroxyethyl)-2-pyrrolidinone, 1-(2-hydroxyethyl) pyrrolidine, 2-ethyl-2-hydroxymethyl-1,3-propanediol (EHPD) (also known as trimethylolpropane), di-(2-hydroxyethyl)-5,5-dimethylhydantoin (commercially available as DANTOCOL® DHE from Lonza, Inc., Allendale, N.J.), glycerol, diethylene glycol, triethylene glycol, tripropylene glycol, tetraethylene glycol, dipropylene glycol, 3-methyl-1,3-butanediol, 3-methyl-1,5-pentanediol, 1-(2-hydroxyethyl)-2-imidazolidinone, 1,6-hexanediol, 1,5-pentanediol, and combinations thereof.

Examples of the non-hydroxylated co-solvent include 2-pyrrolidinone, sulfolane, diethylene glycol dimethyl ether, and combinations thereof.

In some examples, the hydroxylated co-solvent may comprise a pyrrole ring, for instance, a pyrrolidinone ring. In some examples, the non-hydroxylated co-solvent may comprise a pyrrole ring, for instance, a pyrrolidinone ring. In one example, the non-hydroxylated co-solvent is a pyrrolidinone co-solvent, for example, 2-pyrrolidinone. The hydroxylated co-solvent may be 1-(2-hydroxyethyl)-2-pyrrolidinone.

One specific example of the co-solvent system includes 1-(2-hydroxyethyl)-2-pyrrolidinone as the hydroxylated co-solvent, and a combination of 2-pyrrolidinone as the non-hydroxylated co-solvent.

The weight percent ratio of 1-(2-hydroxyethyl)-2-pyrrolidinone and 2-pyrrolidinone may be 57:43 to 63:37. In some examples, the weight percent ratio of 1-(2-hydroxyethyl)-2-pyrrolidinone and 2-pyrrolidinone may be 57:43 to 63:37, for instance, 59:41 to 62:38. In one example, the weight percent ratio of 1-(2-hydroxyethyl)-2-pyrrolidinone and 2-pyrrolidinone may be 60:40 to 61:39.

The total amount of hydroxylated co-solvent and non-hydroxylated co-solvent in the ink composition may be at least at least 18 wt %, for instance, at least 19 wt %. In one example, the total amount of hydroxylated co-solvent and non-hydroxylated co-solvent in the ink composition may be less than 30 wt %, for instance, less than 25 wt %. In one example, the total amount of hydroxylated co-solvent and non-hydroxylated co-solvent in the ink composition may be 19 to 23 wt %, for example, 20 to 22 wt % of the total weight of the ink composition. In one example, the ink composition comprises 1-(2-hydroxyethyl)-2-pyrrolidinone and 2-pyrrolidinone and the total amount of 1-(2-hydroxyethyl)-2-pyrrolidinone and 2-pyrrolidinone is 19 to 23 wt %, for example, 20 to 22 wt % of the total weight of the ink composition.

As mentioned above, examples of the ink composition may also include an acid. The acid may be a fatty acid having a carboxylate head and a long alkyl tail. The acid may be chosen from oleic acid (i.e., cis-octadec-9-enoic acid, having one cis double bond), linoleic acid (two cis double bonds), undecanoic acid, dodecanoic acid, tridecanoic acid, and combinations thereof. In one example, the acid may be oleic acid.

The carboxylate group in the fatty acid may aid in contributing to good decap. In addition, the alkyl tail may have one or two cis double bonds. It has been discovered that the corresponding fully saturated fatty acids with 14 carbons or more, or those with trans double bonds may not provide as effective a benefit for enhancing decap performance. As such, examples of the ink composition of the present disclosure may exclude acids chosen from stearic acid (a fully saturated fatty acid with 18 carbons), elaidic acid (the trans isomer of oleic acid), linolenic acid (three cis double bonds), linear (as opposed to branched) saturated fatty acids having a carbon chain of fewer than 11 carbons, and linear saturated fatty acids having a carbon chain of more than 13 carbons, and combinations thereof.

The acid is present in an amount ranging from about 0.01 to 0.5 wt %, for example, 0.01 to 0.15 wt % of the ink composition. In one example, the acid is oleic acid and is present in an amount of 0.01 to 0.15 wt %, for instance, 0.05 to 0.09 wt % of the ink composition.

Lithium may be present in the composition as an ion in solution, or as a lithium salt of the acid. As an example, the lithium may be added to the ink composition in the form of a number of its salts, for example, lithium chloride, lithium bromide, lithium iodide, lithium hydroxide, lithium acetate, lithium benzoate, lithium nitrate, or combinations thereof. The lithium may be present as part of, for example, the self-dispersed colorant dispersion used as the colorant or may be added separately to form the composition. The amount of lithium may range from 40 to 200 ppm.

Further, other alkali metals, e.g., sodium and/or potassium, may be present in examples of the ink composition. However, lithium may aid in forming an anti-evaporative layer; whereas other alkali metals that may be present may not function to aid in formation of the anti-evaporative layer, nor do they hinder formation of the anti-evaporative layer.

Lithium or other alkali metal ions may be present in the colorant dispersion that is employed to form the ink.

The binder used in the ink composition disclosed in the present disclosure is a polyurethane binder. In addition to diol components and diisocyanate components, the polyurethane polymers also contain acid bearing monomer components. The latter serve to impart colloidal stability to the polymer by electrostatic stabilization. The polyurethane binders may have a molecular weight of 6000 to 500,000 gmol$^{-1}$. The acid number of the polyurethane binders may be 30 to 75 mg KOH/g per polymer. Acid number is defined as the weight of potassium hydroxide in milligrams that is needed to neutralize 1 g of polymer on a dry weight basis. The polyurethane binder is present in an amount of 0.1 to 1 wt % (e.g. less than 1 wt %) of the ink composition, for example, 0.2 to 0.9 wt %. In one example, the polyurethane binder is present in an amount of 0.5 to 0.8 wt %, for instance, 0.7 wt %.

A suitable polyurethane binder is an urea terminated polyurethane, for example, formed from alpha-omega diols and polyether diols. Examples of such polyurethane binders are described in WO 2009/143418. In one example, the urea terminated polyurethane comprises at least one compound of the general Structure (I):

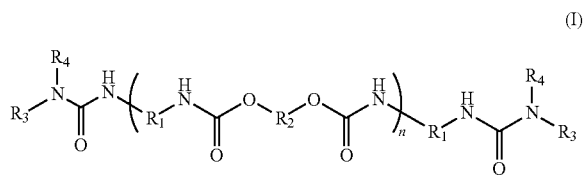

(I)

where:
$R_1$ is alkyl, substituted alkyl, substituted alkyl/aryl from diisocyanate,
$R_2$ is alkyl, substituted/branched alkyl e.g. from a diol,
$R_3$ is alkyl, a non-isocyanate reactive substituted, or branched alkyl from the amine terminating group;

$R_4$ is hydrogen, alkyl, a non-isocyanate reactive substituted, or branched alkyl from the amine terminating group; and n is 2 to 30.

The urea content of the urea terminated polyurethane is at least 2 wt % of the polyurethane.

$R_2$ may be derived from $Z_1$ and $Z_2$, whereby units derived from at least one $Z_1$ and at least one $Z_2$ are present in the polyurethane.

$Z_1$ is of the Structure (II) below:

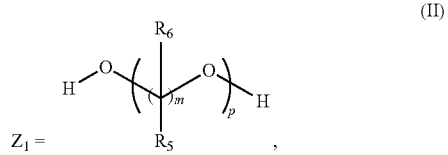

(II)

where
p is greater than or equal to 1,
when p is 1, m is greater than or equal to 3 to 30,
when p is 2 or greater, m is greater than or equal to 3 to about 12, $R_5$, $R_6$ each is independently selected from the group consisting of hydrogen, alkyl, substituted alkyl, and aryl; where the $R_5$ is the same or different for substituted methylene group where the $R_5$ and $R_5$ or $R_6$ can be joined to form a cyclic structure; and $Z_2$ is a diol substituted with an ionic group.

The polyurethane may be prepared by a) providing reactants comprising (i) at least one diol or polyether diol $Z_1$ component comprising a diol, (ii) at least one polyisocyanate component comprising a diisocyanate, and (iii) at least one hydrophilic reactant comprising at least one isocyanate reactive ingredient containing an ionic group, $Z_2$, b) reacting (i), (ii), and (iii) in the presence of a water-miscible organic solvent to form an isocyanate-functional polyurethane pre-polymer; c) adding water to form an aqueous dispersion and d) prior to, concurrently with or subsequent to step c), chain-terminating the isocyanate-functional polyurethane pre-polymer with a primary or secondary amine (e.g. a non-ionic secondary amine).

The urea content of the urea terminated polyurethane may be 2 wt % to 14 wt %, for example 2.5 to 10.5 wt %.

Examples of the ink composition of the present disclosure may further include an additive chosen from non-ionic surfactants, biocides, and combinations thereof.

When a non-ionic surfactant is utilized, a suitable amount of the non-ionic surfactant may range from about 0.01 wt % to about 2 wt %, for instance, 0.03 to 1 wt %, for example, 0.05 to 0.5 wt % or 0.05 to 0.18 wt %. Some specific examples of the non-ionic surfactant that may be used in the ink composition disclosed in the present disclosure include acetylene diols, bis-tartrate esters, 1,2-hexanediol, mono alcohols, N-alkylpyrrolidinones, and combinations thereof. One example of the acetylene diol is SURFYNOL® 104, available from Air Products and Chemicals, Inc., Allentown, Pa. Examples of suitable bis-tartrate esters include diisoamyl tartrate, dibutyl tartrate, dibenzyl tartrate, and diisopropyl tartrate. Some examples of suitable mono alcohols include lauryl alcohol (i.e., 1-dodecanol), oleyl alcohol (i.e., octadec-9-en-1-ol), stearyl alcohol (i.e., 1-octadecanol), and combinations thereof. Examples of the N-alkylpyrrolidinones are N-octylpyrrolidinone and N-dodecylpyrrolidinone. Some commercially available N-alkylpyrrolidinones include SURFADONE® LP-100 (octylpyrrolidinone) and SURFADONE® LP-300 (dodecylpyrrolidinone), both of which are available from Ashland Inc. In one example, the non-ionic surfactant is selected so that it does not include any ethyleneoxy groups. In one example, the non-ionic surfactant is an acetylene diol e.g. SURFYNOL® 104.

When a biocide is utilized, a suitable amount of the biocide may range from about 0.05 wt % to about 0.5 wt %. It is to be understood that the upper limit for the biocide(s) may depend upon the type of biocide and its toxicological effect and/or regulatory requirements. Suitable biocides include, for example, PROXEL™ GXL, KORDEK™ MLX (The Dow Chemical Co.), BIOBAN™ CS-1246 (The Dow Chemical Co.) and/or ACTICIDE® B20 and/or M20 (Thor GmbH).

In any of the examples disclosed in the present disclosure, a balance (up to 100 wt %) of the composition is water.

The pH of examples of the ink composition may range from about 7 to about 13. It may be desirable that the ink composition have a basic pH, ranging anywhere from greater than 8 to 12. When the initial pH of the resulting ink composition is acidic, neutral, or near-neutral basic (e.g., having a pH ranging from 7.1 to 8), it may be desirable to adjust the pH of the resulting ink composition to a basic or more basic pH. Any suitable base may be added to adjust the pH, as long as the added base does not interfere with the other desirable properties of the ink composition. Some examples of suitable bases include NaOH or KOH. The amount of base added will depend, at least in part, on the initial pH of the ink composition and the desired final pH of the ink composition. In an example, the pH is adjusted from about 7 to about 11, and a suitable amount of base is added until this pH is obtained.

To further illustrate the present disclosure, examples are given in the present disclosure. It is to be understood that these examples are provided for illustrative purposes and are not to be construed as limiting the scope of the present disclosure.

EXAMPLE

The ink compositions of Table 1 were prepared. Amounts are shown in wt % and the balance of the compositions was water.

TABLE 1

| Component | Function | Comparative Ex 1 (wt %) | Ex 2 (wt %) |
|---|---|---|---|
| C black dispersion | Colorant | 3.00 | 3.65 |
| Urea capped polyurethane copolymer binder | Binder | 0.70 | 0.70 |
| Di-(2-Hydroxyethyl)-5,5-Dimethylhydantoin | Co-solvent | 9.00 | — |
| 2-pyrrolidone | Co-solvent | 12.50 | 8.50 |
| 1-(2-hydroxyethyl)-2-pyrrolidinone | Co-solvent | — | 13.00 |
| Oleic Acid | Decap Additive | 0.15 | 0.07 |
| Acetylenic diol | Surfactant | — | 0.05 |
| Ethoxylated acetylenic diol | Surfactant | 0.20 | — |
| Biocide | | 0.18 | 0.25 |

The inks were printed onto two different print media, a Non-colorlok™ print medium and Colorlok™ print medium. The optical densities of the prints were compared. For both print media, the optical densities of the images formed using the ink of Example 2 were superior to the densities of the images formed using the ink of Comparative Example 1. Specifically, the optical density achieved with the ink of Example was 9% greater than the optical density achieved with the ink of Comparative Example 1 for both Non-colorlok™ and Colorlok™ print media.

The durability of the images was also compared. A text image printed using the ink was highlighted using a highlighter pen. The smear caused by the highlighter outside the printed image was determined. For both print media, the durability of the images formed using the ink of Example 2 were comparable to the durability of the images formed using the ink of Comparative Example 1.

Decap performance (ease of print nozzle recovery after print nozzle has been left idle for a short period) was determined for the ink compositions of Comparative Example 1 and Example 2, respectively. Specifically, the print nozzle was left idle for 16 seconds and the number of spits required for the print nozzle to recover after the idle period was determined. With the ink composition of Comparative Example 1, the print nozzle required 8 spits per nozzle. In contrast, with the ink composition of Example 2, the print nozzle required 4 spits. The results are shown in the table below. The results show that Example 2 has superior decap performance, leading to superior nozzle health.

| Ink Composition | Number of spits required by print nozzle to recover after 16 seconds idle |
|---|---|
| Comparative Example 1 | 8 |
| Example 2 | 4 |

Figure 2:
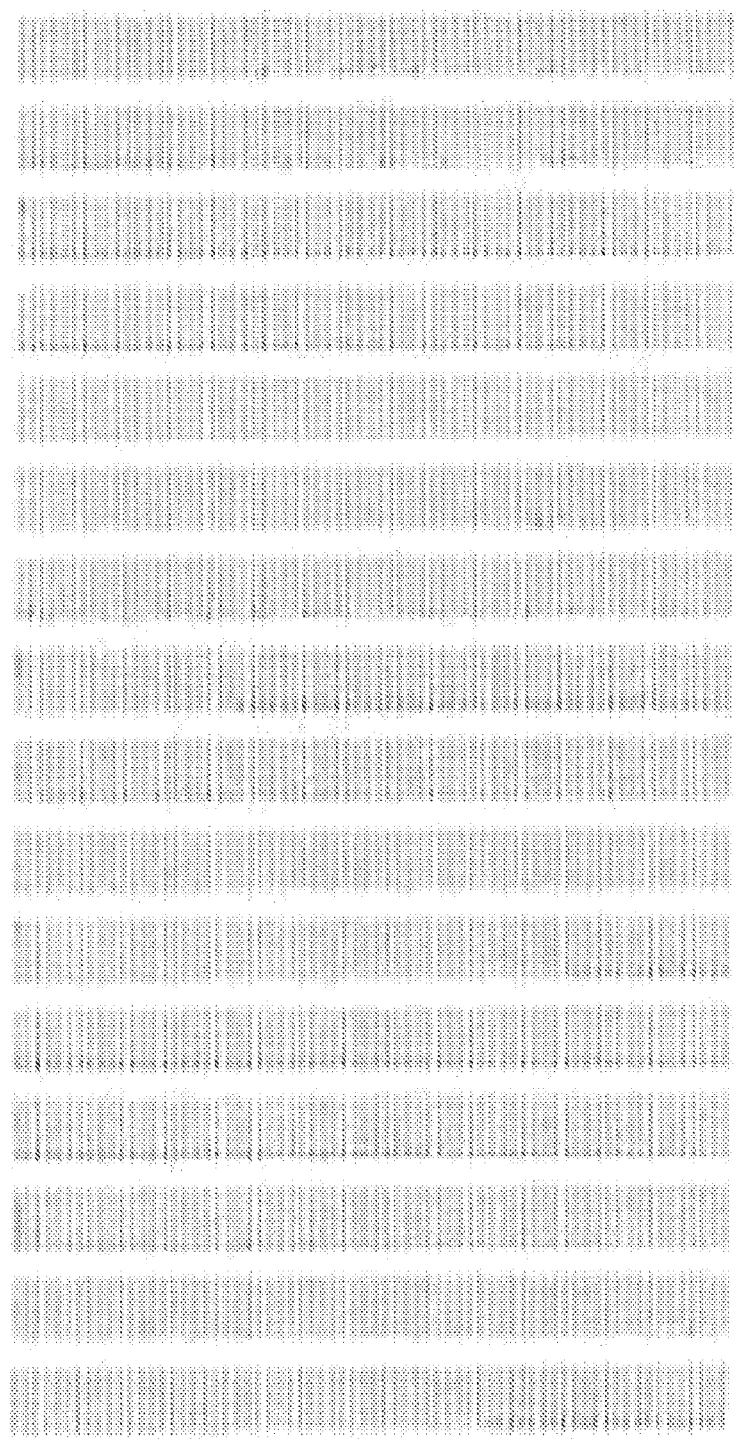

Ink cartridges filled with inks of Comparative Example 1 and Example 2 were stored capped for 4 weeks. After the 4 week period, the inks were inkjet printed onto a sheet of paper. An example of the first sheet of paper printed using the stored ink of Comparative Example 1 is shown in FIG. 1. As can be seen from FIG. 1, the pattern printed using the stored ink of Comparative Example 1 shows random nozzle failure, with rows in the middle of the page where the ink failed to print. An example of the first sheet of paper printed using the stored ink of Example 2 is shown in FIG. 2. As can be seen from FIG. 2, the pattern printed using the stored ink of Example 2 is even. Overall, the ink of Comparative Example 1 was found to be 17% more prone to nozzle failure (based on the number of first pages showing signs of nozzle failure obtained in a given batch).

In describing and claiming the examples disclosed in the present disclosure, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

The invention claimed is:

1. An ink composition comprising
   a colorant;
   a hydroxylated co-solvent;
   a non-hydroxylated co-solvent, wherein the weight percent ratio of the hydroxylated co-solvent to the non-hydroxylated co-solvent in the ink composition ranges from 55:45 to 65:35; and wherein the total amount of hydroxylated co-solvent and non-hydroxylated co-solvent in the ink composition is at least 18 wt %;
   a urea-capped polyurethane binder; wherein the amount of polyurethane binder in the ink composition is 0.1 to less than 1 wt %; and
   water.

2. An ink as claimed in claim 1, which further comprises an acid selected from at least one of oleic acid, linoleic acid, undecanoic acid and dodecanoic acid.

3. An ink as claimed in claim 2, which comprises 0.01 to 0.15 wt % of acid.

4. An ink as claimed in claim 3, wherein the acid is oleic acid.

5. An ink as claimed in claim 1, which further comprises lithium ions.

6. An ink as claimed in claim 1, wherein the colorant is a self-dispersed carbon black dispersion.

7. An ink as claimed in claim 6, wherein the total amount of self-dispersed carbon black dispersion and polyurethane binder is 3 to 4.5 weight % of the ink composition.

8. An ink as claimed in claim 1, wherein:
   the hydroxylated co-solvent is selected from the group consisting of 2-methyl-1,3-propanediol, 1-(2-hydroxyethyl) pyrrolidine, 1-(2-hydroxyethyl)-2-pyrrolidinone, 2-ethyl-2-hydroxymethyl-1,3-propanediol, di-(2-hydroxyethyl)-5, 5-dimethylhydantoin, glycerol, diethylene glycol, triethylene glycol, tripropylene glycol, tetraethylene glycol, dipropyleneglycol, 3-methyl-1,3-butanediol, 3-methyl-1,5-pentanediol, 1-(2-hydroxyethyl)-2-imidazolidinone, 1,6-hexanediol, 1,5-pentanediol, and combinations thereof; and
   the non-hydroxylated co-solvent is selected from the group consisting of 2-pyrrolidinone, diethyleneglycol dimethyl ether, and combinations thereof.

9. An ink composition as claimed in claim 1 wherein:
   the hydroxylated co-solvent is present in an amount ranging from 11 to 14.5 wt % of the ink composition; and
   the non-hydroxylated co-solvent is present in an amount ranging from 7 to 10.5 wt % of the ink composition.

10. An ink composition as claimed in claim 1, wherein the hydroxylated co-solvent is 1-(2-hydroxyethyl)-2-pyrrolidinone and the non-hydroxylated co-solvent is 2-pyrrolidinone.

11. An ink composition as claimed in claim 10, wherein the weight percent ratio of 1-(2-hydroxyethyl)-2-pyrrolidinone and 2-pyrrolidinone is 57:43 to 63:37.

12. An ink composition as claimed in claim 1, which comprises 0.5 to 0.9 wt % polyurethane binder.

13. An ink composition as claimed in claim 1, wherein the total amount of hydroxylated co-solvent and non-hydroxylated co-solvent in the ink composition is at least 19 to 23 wt %.

14. The ink composition of claim 1, wherein the hydroxylated co-solvent consists essentially of a single hydroxylated co-solvent and the non-hydroxylated co-solvent consists essentially of a single non-hydroxylated co-solvent.

15. The ink composition of claim 1, wherein the urea-capped polyurethane binder comprises general structure (I):

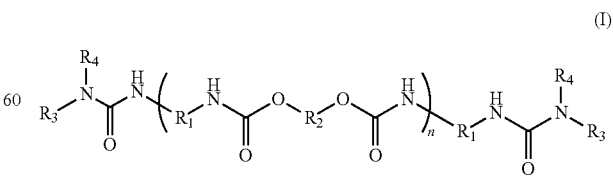

wherein:
$R_1$ is alkyl, substituted alkyl, substituted alkyl/aryl,
$R_2$ is alkyl, substituted/branched alkyl, R₃ is alkyl, a non-isocyanate reactive substituted, or branched alkyl;

R₄ is hydrogen, alkyl, a non-isocyanate reactive substituted, or branched alkyl; and n is 2 to 30.

16. The ink composition of claim 1, wherein the urea-capped polyurethane binder has a urea content from 2 wt % to 14 wt % with respect to the total weight of the urea-capped polyurethane binder.

17. An ink composition comprising a colorant;

a hydroxylated co-solvent;

a non-hydroxylated co-solvent, wherein the weight percent ratio of the hydroxylated co-solvent to the non-hydroxylated co-solvent in the ink composition ranges from 55:45 to 65:35;

a urea-capped polyurethane binder; and water.

* * * * *